(12) United States Patent
Sliekers et al.

(10) Patent No.: US 12,022,842 B2
(45) Date of Patent: Jul. 2, 2024

(54) FRUIT FERMENTS CONTAINING PROPIONATE AND USE THEREOF

(71) Applicant: PURAC BIOCHEM BV, Gorinchem (NL)

(72) Inventors: Arne Olav Sliekers, Breda (NL); Eelco Anthonius Johannes Heintz, Gorinchem (NL)

(73) Assignee: PURAC BIOCHEM BV, Gorinchem (NL)

( * ) Notice: Subject to any disclaimer, the term of this patent is extended or adjusted under 35 U.S.C. 154(b) by 182 days.

(21) Appl. No.: 17/726,778

(22) Filed: Apr. 22, 2022

(65) Prior Publication Data
US 2022/0240528 A1 Aug. 4, 2022

Related U.S. Application Data

(63) Continuation of application No. 15/946,157, filed on Apr. 5, 2018, now Pat. No. 11,337,433, which is a continuation of application No. 13/991,499, filed as application No. PCT/EP2011/072126 on Dec. 7, 2011, now Pat. No. 9,961,914.

(30) Foreign Application Priority Data

Dec. 7, 2010 (EP) ..................................... 10194044

(51) Int. Cl.
| | |
|---|---|
| A23B 7/155 | (2006.01) |
| A23B 7/10 | (2006.01) |
| A23L 2/38 | (2021.01) |
| A23L 2/42 | (2006.01) |
| A23L 19/00 | (2016.01) |

(52) U.S. Cl.
CPC ................ *A23B 7/155* (2013.01); *A23B 7/10* (2013.01); *A23L 2/382* (2013.01); *A23L 2/42* (2013.01); *A23L 19/00* (2016.08); *A23L 19/09* (2016.08); *A23V 2400/61* (2023.08); *A23V 2400/617* (2023.08)

(58) Field of Classification Search
None
See application file for complete search history.

(56) References Cited

U.S. PATENT DOCUMENTS

| | | | |
|---|---|---|---|
| 2,261,926 A | 11/1941 | Nolte et al. | |
| 4,497,833 A | 2/1985 | Anderson | |
| 4,676,987 A | 6/1987 | Ahern et al. | |
| 4,743,453 A | 5/1988 | Ahern et al. | |
| 4,794,080 A | 12/1988 | Mays et al. | |
| 5,096,718 A | 3/1992 | Ayres et al. | |
| 5,137,736 A | 8/1992 | Eaton et al. | |
| 5,989,612 A | 11/1999 | King et al. | |
| 6,132,786 A | 10/2000 | Poulos et al. | |
| 6,905,716 B2 | 6/2005 | Selmer-Olsen | |
| 6,953,574 B2 | 10/2005 | Sobol et al. | |
| 2009/0104312 A1 | 4/2009 | Kamarei et al. | |
| 2010/0316763 A1 | 12/2010 | Choi et al. | |

FOREIGN PATENT DOCUMENTS

| | | |
|---|---|---|
| EP | 1 169 925 A1 | 1/2002 |
| EP | 2 227 965 A1 | 9/2010 |
| JP | H07-051038 A | 2/1995 |
| JP | 2005-526480 A | 9/2005 |
| WO | 95/21544 A1 | 8/1995 |
| WO | 03/005963 A2 | 1/2003 |
| WO | 2004/001022 A1 | 12/2003 |
| WO | 2010/078670 A2 | 7/2010 |

OTHER PUBLICATIONS

Jul. 10, 2015 Office Action issued in Japanese Application No. 2013-542531.
"National Nutrient Database for Standard Reference Release 28," [online], United States Department of Agriculture Agricultural Research Service, Basic Report: 09206, Orange juice, raw, URL, https://ndb.nal.usda.gov/ndb/foods/show/2289?fgcd=&manu=&1facet=&format=&count=&max=35&offset=&sort=&qlookup=09206, Apr. 27, 2016.
Apr. 8, 2016 Office Action issued in Japanese Application No. 2013-542531.
Mar. 13, 2017 Office Action Issued in U.S. Appl. No. 13/991,499.
Babuchowski et al., "Propionibacteria in Fermented Vegetables," Lait, 1999, vol. 79, pp. 113-124.
Barefoot et al., "Antibiosis Revisited: Bacteriocins Produced by Dairy Starter Cultures," Journal of Dairy Science, 1993, vol. 76, pp. 2366-2379.
International Search Report issued in International Patent Application No. PCT/EP2011/072126 mailed Feb. 10, 2012.
International Preliminary Report on Patentability issued in International Patent Application No. PCT/EP2011/072126 issued Jun. 12, 2013.
Contreras et al., "International Journal of Food Science and Technology" 1992, vol. 27 pp. 515-529.
Cherkasova et al. RU 2136175 Derwent Abstract 1 page.
Brown "Just Add a Little Water" Oct. 27, 2004 Los Angeles Times 5 pages.
Himmi et al. "Propionic acid fermentation of glycerol and glucose by Propionibacterium . . . " Applied Microbilogy and Biotechnology 2000 vol. 53 pp. 435-440 (Year: 2000).

(Continued)

*Primary Examiner* — Felicia C Turner
(74) *Attorney, Agent, or Firm* — Oliff PLC

(57) ABSTRACT

Methods to prepare a fruit ferment containing propionic acid and/or a salt thereof comprising i) obtaining a liquid fruit preparation, ii) optionally supplementing the liquid fruit preparation with water and/or with additional components to support fermentation, iii) fermenting the optionally supplemented liquid fruit preparation with a propionic acid-producing bacterial strain, iv) optionally further processing the fermentation product, to obtain the fruit ferment. Next to a propionic acid-producing bacterial strain, a lactic acid-producing bacterial strain may be used in the fermentation. And, a fruit ferment obtainable by said method.

14 Claims, No Drawings

(56) References Cited

OTHER PUBLICATIONS

Mar. 8, 2021 Notice of Opposition issued in European Patent Application No. 11802325.8.
J. Liu et al. "Commensalistic Interaction Between Lactobacillus acidophilus and Propionibacterium shermanii." Applied and Environmental Microbilogy, vol. 44, No. 3, pp. 715-722, Sep. 1982.
H. Wood et al. "LXXXVIII. Mechanism of Glucose Dissimilation by the Propionic Acid Bacteria" Department of Bacteriology, University of Iowa, vol. 30, No. 4, pp. 618-623, 1936.
I.H. Lee et al. "Dynamics of Mixed Culture of Lactobacillus acidophilus and Propionibacterium shermanii." Biotechnology and Bioengineering, vol. XVIII, No. 3, pp. 513-526, 1976.
A. Busairi. "Conversion of Pineapple Juice into Lactic Acid in Batch and Fed—Batch Fermentation Systems." Department of Chemical Engineering, University of Diponegoro, vol. 12, No. 2, pp. 98-101, Dec. 2008.
M. Walker et al. "The growth of Propionibacterium cyclohexanicum in fruit juices and its survival following elevated temperature treatments." Food Microbiology, vol. 24, 2007.
E.R. Wolford et al. "Propionates Control Microbial Growth in Fruits, Vegetables." Food Industries, pp. 622-624 and 726-734, Jun. 1945.
A.T. Johns. "The Mechanism of Propionic Acid Formation by Clostridium propionicum." Journal of General Microbiology, vol. 6, pp. 123-127, 1952.
F.W. Leaver et al. "The Fermentation of Three Carbon Substrates by Clostridium propionicum and Propionibacterium." Journal of Bacteriology, vol. 70, No. 5, Mar. 1955.
Y. Stepak et al. "Identification and Determination of Sugars in Some Fruit Juices." Journal of the Association of Official Analytical Chemists, vol. 54, No. 5, pp. 1215-1217, 1971.
"MRS Broth." Lab M, 1994.
N. Gardner et al. "Production of Propionibacterium shermanii biomass and vitamin B12 on spent media." Journal of Applied Microbiology, vol. 99, Mar. 2005, pp. 1236-1245.
X. Haiyan et al. "Primary study on growth and acid production of propionibacterium." Guangzhou Food Science and Technology, vol. 20, No. 2, Jun. 2004, pp. 1-3.
X. Xiaokui. "Advance on methods for producing propionic acid by means of fermentation." Journal of Microbiology China, No. 6, Dec. 1999, pp. 443-446.
X. Hong. "Production of propionic acid by fermentation process." Food and Fermentation Industries, vol. 23, No. 7, Dec. 1997, pp. 62-65.
Jul. 5, 2021 Office Action issued in Chinese Patent Application No. 201810873954.1.

FRUIT FERMENTS CONTAINING PROPIONATE AND USE THEREOF

This is a continuation of application Ser. No. 15/946,157 filed Apr. 5, 2018, which is a continuation of application Ser. No. 13/991,499 filed Jun. 19, 2013, which is a National Stage Application of PCT/EP2011/072126 filed Dec. 7, 2011, which claims the benefit of EP 10194404.3 filed on Dec. 7, 2011.

The entire disclosures of the prior applications are hereby incorporated by reference herein their entireties.

The present invention relates to fruit based fermented products containing propionate and uses thereof.

Yeasts and acetic acid bacteria are the most common microorganisms involved in the spontaneous fermentation of fruits, converting carbohydrates to alcohol and/or acetic acid. Also, these organisms can act as spoilage organisms of fruit based products such as juices. On the other hand, Propionibacteria are involved in the fermentation of dairy products, most commonly cheeses, converting carbohydrates and lactic acid to mainly propionic acid, but also some acetic acid, carbon dioxide and succinic acid. Propionic acid especially inhibits yeasts and moulds but also other bacteria.

Babuchowski et al. (Lait (1999), 79, 113-124) discloses the use of Propionibacteria to produce fermented vegetables. The propionic acid content of red beet juice fermented with *Propionibacterium freudenreichii* and *Propionibacterium thoenii*, respectively, reached a value of 1.56% and 2.18%, respectively, after 14 days of fermentation. Such a fermentation period is much to long for industrial application (high costs and high risk for contamination). When fermentation was done with propionibacteria and lactic acid bacteria together, the propionic acid content of the fermented red beet juice reached a maximum value of only 0.12% after 1 day of fermentation, whereas prolonged fermentation of 10-14 days resulted in a lower propionic acid content (about 0.04%).

It was now surprisingly found that when liquid fruit preparations, like juices, extracts, purées, were purposively fermented with members of the genus *Propionibacterium*, a ferment can be obtained having a high propionate content, even without the addition of additional nutrients, when fermentation was done for a period of 1 to 4 days. The ferment inhibits yeasts and moulds when applied in e.g. fruit based products, but, advantageously, hardly influences the taste and flavour of the fruit based product, even when applied in a high concentration.

Thus, in a first aspect the present invention discloses a method to prepare a fruit ferment containing propionate by subjecting a liquid fruit preparation to fermentation by a propionic acid-producing bacterial strain. The method in particular comprises:
i) obtaining a liquid fruit preparation,
ii) optionally supplementing the liquid fruit preparation with water and/or with additional components to support fermentation,
iii) fermenting the optionally supplemented fruit preparation with a propionic acid-producing bacterial strain,
iv) optionally further processing the fermentation product, to obtain the fruit ferment.

A fruit for use in the methods and fruit ferments as described herein is the edible, fleshy, seed-associated structure of certain plants. Such a fleshy structure typically has a natural water content of at least 65% (w/w), even at least 70% (w/w) or at least 75% (w/w). Such fruits include sweet fruits like apples, pears, oranges, grapefruits, grapes, strawberries, melons, bananas, pineapples, passion fruits, peaches, mangos, guavas, non-sweet fruits like lemons, avocados, and vegetable-like fruits like tomatoes, cucumbers, bell peppers, pumpkins. A preferred fruit for use in the method of this aspect is a sweet fruit and/or a tomato. An especially preferred fruit is apple, pear, orange, grape, pineapple, melon or tomato, or any mixture thereof. The fruits for use in the methods and fruit ferments as described herein do not include nuts and cereal grains.

The fruit of choice is processed to obtain a liquid fruit preparation. Suitable liquid fruit preparations for instance are a juice, an extract or a purée (mashed fruit). Processing of the fruit is done using techniques commonly known to those skilled in the art. The liquid fruit preparation may be obtained from a concentrate. A single fruit type or mixture of two or more fruit types may be used.

The liquid fruit preparation optionally may be supplemented with water and/or with additional components necessary to support and/or improve bacterial fermentation. This supplementation may be done prior to and/or during fermentation.

Dilution of the liquid fruit preparation with water suitably may be done to obtain a suitable sugar level for the bacterial strain used in the fermentation and to advantageously accelerate the fermentation process. A suitable sugar level of the liquid fruit preparation may be 1.5 to 10% (w/w).

The liquid fruit preparation, optionally diluted, may further be supplemented with additional components necessary to support and/or improve bacterial fermentation. For instance, the additional components may be additional carbon source such as glucose or sucrose, additional nitrogen source such as yeast extract and/or additional minerals and/or vitamins. Advantageously, the amount of additional components in general is low, so that sensory properties of the resulting ferment are not negatively affected. It is preferred not to supplement the liquid fruit preparation at all.

Fermentation is done using a propionic acid-producing bacterial strain. Preferred propionic acid-producing bacterial strains are strains of the genus *Propionibacterium*. Suitable species include *Propionibacterium freudenreichii*, *Propionibacterium shermanii*, *Propionibacterium acidi-propionici*, *Propionibacterium thoenii* and/or *Propionibacterium jensenii*. Examples of other propionic acid-producing bacterial species are *Clostridium propionicum*, *Selenomonas ruminantum* and/or *Bacteroides ruminicola* and/or species of the genus *Veillonella*. Preferred *Propionibacterium* species are *Propionibacterium freudenreichii*, *Propionibacterium shermanii* and/or *Propionibacterium acidi-propionici*. A single strain or a mixture of two or more strains or species may be used.

In one embodiment, the fermentation with a propionic acid-producing bacterial strain is supplemented with one or more strains of lactic acid-producing bacteria. Suitable lactic acid producing-bacterial strains are found within lactic acid bacteria belonging to the order Lactobacillales or within moderately thermophilic *Bacillus* species. Examples of lactic acid bacteria are *Lactobacillus casei*, *Lactobacillus acidophilus*, *Lactobacillus delbrueckii*, *Lactobacillus paracasei*, *Lactobacillus helveticus*, *Lactococcus lactis* and/or *Lactococcus plantarum*. Examples of moderately thermophilic *Bacillus* species are *Bacillus coagulans*, *Bacillus smithii* and/or *Bacillus thermoamylovorans*. Moderately thermophilic *Bacillus* species are defined as *Bacillus* species that are capable of growing at temperatures between 30-65° C.

Lactic acid-producing bacteria are advantageously used to convert sugars in the liquid fruit preparation to lactic acid, which lactic acid is particularly suitable as a carbon source for the propionic acid-producing bacterial strain. Supplementing the fermentation with one or more strains of lactic acid producing bacteria may be done in various ways. It may be done by firstly fermenting the liquid food preparation with one or more strains of lactic acid producing bacteria and then fermenting the resulting lactic acid containing fermentation broth or fermentation fluid (i.e. with or without lactic acid producing bacteria) with a propionic acid-producing bacterial strain. It also may be done by simultaneously fermenting the liquid food preparation with one or more strains of lactic acid-producing bacteria and of propionic acid-producing bacteria. In the latter option, the lactic acid-producing bacteria may constitute, at the end of the fermentation process, from 10% to 90% of the total weight of bacteria used in the fermentation process.

The fermentation process further preferably is substantially devoid of contaminating microorganisms, i.e. other microorganisms than the ones described hereinabove. For instance, at the end of fermentation the percentage of contaminating microorganisms is at the most 5% (w/w) of the total amount of biomass produced.

The fermentation conditions are typically chosen conform the growth requirements of the microbial strain(s) to be used in the fermentation process.

It is important to maintain the pH of the liquid fruit preparation, initially and during fermentation, at a value between 4.5 and 7, preferably between 5 and 7. This may be done by the addition of a suitable base, e.g. sodium hydroxide, potassium hydroxide, calcium hydroxide, magnesium hydroxide, calcium carbonate, ammonium hydroxide, ammonium carbonate, and/or natural sources containing these alkali substances like lime, limestone, chalk.

The fermentation process is typically done for a time period suitable to consume the majority of the available sugars, preferably all of the sugars, and preferably also the majority or all of the lactate, if present. However, it is also possible to ferment only part of the available sugars. The available sugars typically are the sugars naturally present in the fruit and any sugar added as additional carbon source. At the end of fermentation, the propionate level of the fermentation fluid (i.e. measured after separation of the microbial biomass) may vary from 0.25 to 10% (w/w).

Typically, fermentation is carried out for a time period from 20 to 120 hours, preferably from 20 to 100 hours, more preferably from 30 to 90 hours.

The fermentation process is generally carried out at a temperature in the range of 10 to 70° C., in particular in the range of 25 to 55° C., more in particular in the range of 25 to 35° C.

After fermentation is ended, the fermentation product may optionally be further processed as desired, e.g. depending on its intended use. Advantageously, it is in general not necessary to apply further processing steps to improve sensory properties.

For instance, solids including biomass may be separated from the fermentation product to obtain a fermentation fluid. Any method known to the skilled person for this solid removal may be used, e.g. ultrafiltration, microfiltration, static decantation, or centrifugation. It is also possible to remove only part of the solids from the fermentation product.

The fermentation product including solids or the fermentation fluid from which solids are separated may also be concentrated. Concentration may be carried out by any method known in the art. It may be carried out to form a concentrated solution, for instance by concentrating up to about 20 times, such as 8 to 16 times. Suitable methods include for example (vacuum) evaporation and methods based on membrane technology, such as reverse osmosis. It is also possible to prepare a solid granular product, via for example extrusion or spray-drying.

The fermentation product including solids, the fermentation fluid from which solids are separated or the concentrated product may also be pasteurized or sterilized.

Standardization may be necessary to achieve a fruit ferment having a consistent composition.

In a second aspect, the present invention relates to a fruit ferment containing propionate.

The fruit ferment of this aspect is obtainable by subjecting a liquid fruit preparation as described in the first aspect to fermentation using a propionic acid-producing bacterial strain, optionally together with a lactic acid-producing bacterial strain, as also described in the first aspect.

The fruit ferment comprises propionate in a concentration ranging from 0.25 to 80% (w/w), preferably from 0.5 to 70% (w/w), more preferably from 1 to 60% (w/w). The propionate content thereby depends on the water content of the fruit ferment and on the presence or absence of bacterial biomass. Typically, the fruit ferment may have a water content of 0 to 99.5% (w/w), depending on the further processing (concentrating and/or drying) of the fermentation product after fermentation.

Preferably, the fruit ferment further comprises acetate in a concentration ranging from 0.1 to 60% (w/w). The weight ratio of propionate to acetate in such a ferment thereby ranges from 0.5 to 10, preferably from 1.5 to 5.

Also preferably, the fruit ferment further comprises succinate in a concentration ranging from 0.002 to 1% (w/w). The weight ratio of propionate to succinate in such a ferment thereby ranges from 200 to 15, preferably from 150 to 25.

The terms propionate, acetate and succinate as used herein are meant to encompass the acid as well as the salt form. In that regard, typical salts are sodium, potassium, ammonium, calcium and magnesium salts, or combinations thereof.

The fruit ferment further may comprise part or all of the propionic acid-producing bacterial cells and, when used, the lactic acid producing bacterial cells, of the fermentation process.

As a consequence of fermentation, the fruit ferment further has a reduced sugar content as compared to the starting liquid fruit preparation. At least 5% of the amount of sugar present in the starting liquid fruit preparation, preferably at least 10%, more preferably at least 20%, is converted by fermentation. Sugar in this context refers to hexose mono- and/or disaccharides, including fructose, glucose and/or sucrose.

In one embodiment, the fruit ferment of this aspect is obtainable by the methods as described in the first aspect.

The fruit ferment of this aspect may be a food or beverage as such and/or may be used as an additive for or an ingredient of a food and/or beverage.

A further aspect of the invention relates to a composition comprising the fruit ferment of the previous aspect.

Such a composition may be an additive composition for food and/or beverages comprising additional ingredients next to the fruit ferment. Examples of such additional ingredients are lactic acid and/or salts thereof, acetic acid and/or salts thereof, vinegar, cinnamic acid and/or salts thereof, vanillin, nisin, sorbic acid and/or salts thereof and fermentation products containing lactic acid and/or salts thereof, acetic acid and/or salts thereof, propionic acid and/or salts thereof, benzoic acid and/or salts thereof, and/or one or more of the following components: nisin, natamycin, polylysin, bacteriocins.

The fruit ferment or the additive composition comprising the fruit ferment as described herein may advantageously be used in food and/or beverages, for instance to inhibit yeast and/or mould growth in the food or beverage. Because of the neutral or delicate taste and flavour of the fruit ferment, it does not provide any substantial off-taste and/or off-flavour to the food or beverage, even when applied in a high concentration. Typically, the fruit ferment may be added to a food or beverage to provide a propionate level in the food or beverage in a range of 0.005 to 1% (w/w), preferably in a range of 0.02 to 0.5% (w/w), more preferably in a range of 0.05 to 0.2% (w/w).

In one embodiment, the fruit ferment is advantageously added to a fruit-based food and/or beverage, in particular to a fruit-based food and/or beverage that contains the same type of fruit as the fruit that is used for preparing the fruit ferment. In this way, the fruit-based food or beverage obtains novel properties, for instance with regard to taste, flavour, colour, storage stability. Properties like taste, flavour and colour of the fruit ferment are thereby advantageously in line with those of the fruit-based food and/or beverage. A fruit-based food and/or beverage typically may have a fruit content varying from about 3% (w/w), such as in soft drinks, to 100% (w/w), such as in undiluted fruit juices, fruit purées or fruit concentrates.

Thus, in a further aspect there is provided a method to improve the sensory properties and the storage stability of a fruit-based food and/or beverage by supplementing the food and/or beverage with a fruit ferment as described herein. The fruit ferment thereby preferably has a taste, flavour and/or colour profile that does not substantially deviate from the profile of the fruit-based food and/or beverage. For instance, a melon ferment may be added to an apple-based food and/or beverage, whereas a tomato ferment may not. More preferably, the fruit ferment is prepared from the same fruit or fruits as the fruit or fruits included in the fruit-based food and/or beverage.

The fruit ferment when still containing microbial cells further may advantageously be used a probiotic.

EXAMPLE 1

Preparation of Various Fruit Ferments

*P. freudenreichii* was precultured at a starting pH of 6.5, on a medium containing 15 g/l Difco certified yeast extract and 30 ml/l of a 50% sodium lactate solution. The culture was incubated at 30° C. until it was fully grown. *Lactobacillus paracasei* was precultured on MRS medium (de Man et al. 1960, *J Appl Bact* 23 (130-135), "A Medium for the Cultivation of Lactobacilli"), purchased from Oxoid, at a start pH of 5.8.

Several cases were tested, with different media compositions. Each case is listed below in Table 1, wherein the amount of puree or juice per liter fermentation medium is indicated:

| Case | Ingredients per liter fermentation medium (adjusted to 1 liter with water) |
|---|---|
| 1 | 210 g Tomato paste (providing 35.7 g/L sugar) |
| 2 | 0.5 L water melon juice (freshly prepared) |
| 3 | 0.5 L water melon juice (freshly prepared) 10 g difco yeast extract |
| 4 | 0.75 L watermelon juice (freshly prepared) |
| 5 | 0.25 L apple juice (freshly prepared) |
| 6 | 0.33 L orange juice (freshly prepared) |
| 7 | 0.25 L white grape juice (freshly prepared) |
| 8 | 0.33 L pineapple juice (freshly prepared) |

The juices in Table 1 were prepared by a standard juice extractor, in this case a Philips HR1858 juicer. After obtaining the juice, it was immediately put into a fermentation reactor without further filtration.

Fermentation reactors were sterilized at 121° C. for 20 minutes. The pH in the reactor was maintained at pH 6.5 with 2.5 M NaOH (100 g/L). Stirring of the media was done at 250 rpm.

At the start of a fermentation, 10% v/v of a culture of lactic acid bacteria and 10% v/v of a culture of propionic acid bacteria were added to diluted juice.

After fermentation (48-96 hours), solids including biomass were removed using centrifugation at 7000×g for 20 minutes.

TABLE 1

Acids present in juice after fermentation and solids removal (case 4 not determined)

| component | Case 1 | Case 2 | Case 3 | Case 4 | Case 5 | Case 6 | Case 7 | Case 8 |
|---|---|---|---|---|---|---|---|---|
| formic acid | 0.12 | 0.12 | 0.19 | n.d. | 0.04 | 0.12 | 0.03 | 0.07 |
| acetic acid | 0.86 | 0.6 | 0.8 | n.d. | 0.52 | 0.7 | 0.60 | 0.71 |
| propionic acid | 1.5 | 1.5 | 1.4 | n.d. | 1.2 | 1.1 | 1.4 | 1.4 |
| ethanol | <0.02 | 0.02 | 0.04 | n.d. | <0.01 | 0.03 | <0.01 | <0.01 |
| butyric acid | <0.01 | <0.01 | <0.01 | n.d. | <0.01 | <0.01 | <0.01 | <0.01 |
| pyruvic acid | <0.02 | <0.02 | <0.02 | n.d. | <0.02 | <0.02 | <0.02 | 0.02 |
| lactic acid | <0.05 | <0.05 | <0.05 | n.d. | <0.05 | <0.05 | <0.05 | <0.05 |
| 2-hydroxy butyric acid | <0.01 | <0.01 | <0.01 | n.d. | <0.01 | <0.01 | <0.01 | <0.01 |

TABLE 1-continued

Acids present in juice after fermentation and solids removal (case 4 not determined)

| component | Case 1 | Case 2 | Case 3 | Case 4 | Case 5 | Case 6 | Case 7 | Case 8 |
|---|---|---|---|---|---|---|---|---|
| oxalic acid | <0.02 | <0.01 | <0.01 | n.d. | <0.01 | <0.01 | <0.01 | <0.01 |
| sorbic acid | <0.01 | <0.01 | <0.01 | n.d. | <0.01 | <0.01 | <0.01 | <0.01 |
| fumaric acid | <0.02 | <0.01 | <0.01 | n.d. | <0.01 | <0.01 | <0.01 | <0.01 |
| succinic acid | 0.10 | 0.02 | 0.01 | n.d. | 0.03 | 0.02 | 0.04 | 0.05 |
| benzoic acid | <0.03 | <0.03 | <0.03 | n.d. | <0.03 | <0.03 | <0.03 | <0.03 |
| maleic acid | <0.02 | <0.01 | <0.01 | n.d. | <0.01 | <0.01 | <0.01 | <0.01 |

After solids removal, the ferments were concentrated 8-16 times by rotary vacuum evaporation, operating at 80 mbar. The organic acid composition of the concentrated ferments was determined (Table 2):

TABLE 2

Concentration of acids after vacuum evaporation (case 1 not determined)

| component | Case 1 | Case 2 | Case 3 | Case 4 | Case 5 | Case 6 | Case 7 | Case 8 |
|---|---|---|---|---|---|---|---|---|
| formic acid | n.d. | 0.51 | 1.0 | 1.4 | 0.24 | 1.0 | 0.13 | 0.37 |
| acetic acid | 8.6 | 3.0 | 4.1 | 9.9 | 5.4 | 6.5 | 4.7 | 4.3 |
| propionic acid | 15 | 6.8 | 7.9 | 22 | 14 | 11 | 12 | 8.8 |
| ethanol | n.d. | <0.01 | <0.01 | <0.01 | <0.01 | <0.01 | <0.01 | <0.01 |
| butyric acid | n.d. | <0.01 | <0.01 | <0.01 | <0.01 | <0.01 | <0.01 | <0.01 |
| pyruvic acid | n.d. | <0.02 | <0.02 | <0.02 | <0.02 | <0.02 | <0.02 | <0.01 |
| lactic acid | n.d. | <0.05 | <0.05 | 0.07 | <0.05 | <0.05 | <0.05 | <0.05 |
| 2-hydroxy butyric acid | n.d. | <0.01 | <0.01 | 0.01 | <0.01 | <0.01 | <0.01 | <0.01 |
| oxalic acid | n.d. | <0.01 | <0.01 | <0.01 | <0.01 | 0.01 | <0.01 | 0.01 |
| sorbic acid | n.d. | <0.01 | <0.01 | <0.01 | <0.01 | 0.02 | <0.01 | 0.02 |
| fumaric acid | n.d. | <0.01 | <0.01 | <0.01 | <0.01 | <0.01 | <0.01 | <0.01 |
| succinic acid | n.d. | 0.09 | 0.04 | 1.2 | <0.01 | 0.9 | 1.0 | 0.6 |
| benzoic acid | n.d. | <0.03 | <0.03 | <0.03 | <0.03 | <0.03 | <0.03 | <0.03 |
| maleic acid | n.d. | <0.01 | <0.01 | <0.01 | <0.01 | <0.01 | <0.01 | <0.01 |

In the same manner as described above, four ferments (cases 9, 10, 11 and 12) were prepared, but now using a fermentation medium containing per liter of water: 25 g/l Difco yeast extract and 70 g/l sucrose. After biomass removal and concentration, case 9 contained 22% (w/w) propionic acid and case 10 contained 20.4% (w/w) of propionic acid (other acids were not determined). In case 11, the ferment was evaporated to dryness using a rotary evaporator at reduced pressure (60-100 mbar). In case 12, the ferment of case 9 was taken and sodium lactic acid was added until the ferment contained 25% (w/w) of lactic acid. After the addition of lactic acid, the ferment contained 13.7% (w/w) of propionic acid.

EXAMPLE 2

Effect of Tomato Ferment on Yeasts in Tomato Sauce

The efficacy of a tomato ferment was tested in tomato sauce. Tomato sauce was prepared having a composition according to Table 3:

TABLE 3

Composition of tomato sauce

| Ingredient | Dosage (%) | Description | Supplier |
|---|---|---|---|
| Tomato puree | 30.0 | Double concentrated 28/30%; ingredients: tomatoes and salt | Perfekt |
| Salt | 3.2 | Table salt | Jozo |
| Sugar | 20.0 | Cyrstalline sugar | CSM |
| Water | 45.54 | | |
| Vinegar (28.5%) | 1.26 | (=0.36% 100%) | |
| TOTAL | 100 | | | pH = 3.8 (adjusted with HCl or NaOH), aW = approximately 0.94

A propionate-containing sucrose ferment was prepared based on sucrose and yeast extract, containing 22% propionic acid (case 9 of Example 1). Additionally a concentrated tomato ferment was prepared containing 15% propionic acid (case 1 of Example 1). These ferments were added to batches of tomato sauce according to Table 4.

The following yeast strains were cultivated on GPY broth (5 g/l yeast extract, 4 g/l glucose, 5 g/l peptone, at a pH of 5-5.5), and added to the tomato sauce, according to table 4, at an end concentration of approximately 1000 cells per gram: *Pichia membranaefaciens* MUCL 27794, *Candida tropicalis* MUCL 28180, *Zygosaccharomyces rouxii* MUCL 30008. The tomato sauce was incubated at 20° C. with the indicated yeast strain and the indicated ferment (Table 4). Regularly, the colony forming units (cfu) were determined using MEA plates (20 g/l malt extract, 20 g/l glucose, 1 g/l peptone, 20 g/l agar), incubated at 20° C.

TABLE 4

Test set up of a microbiological experiment with sucrose
ferment (case 9) and tomato ferment (case 1) in tomato sauce

| Sample | Name | Tomato ferment added (% w/w) | Sucrose ferment added (% w/w) | Microorganism | Log cfu at day 7 | Log cfu at day 80 |
|---|---|---|---|---|---|---|
| 1 | control | 0 | 0 | Pichia membranaefaciens | 3 | 9.5 |
| 1 | control | 0 | 0 | Candida tropicalis | 1.5 | <1 |
| 1 | control | 0 | 0 | Zygosaccharomycesrouxii | 4 | 8.5 |
| 2 | Low tom | 1 | 0 | Pichia membranaefaciens | <1 | <1 |
| 2 | Low tom | 1 | 0 | Candida tropicalis | <1 | <1 |
| 3 | High tom | 3 | 0 | Pichia membranaefaciens | <1 | <1 |
| 3 | High tom | 3 | 0 | Candida tropicalis | <1 | <1 |
| 4 | Low prop | 0 | 0.6 | Pichia membranaefaciens | <1 | <1 |
| 4 | Low prop | 0 | 0.6 | Candida tropicalis | 1.5 | <1 |
| 5 | High prop | 0 | 1.8 | Pichia membranaefaciens | <1 | <1 |
| 5 | High prop | 0 | 1.8 | Candida tropicalis | <1 | <1 |
| 6 | Med tom | 1.7 | 0 | Zygosaccharomycesrouxii | 1.5 | <1 |
| 7 | Med prop | 0 | 1 | Zygosaccharomycesrouxii | 1 | <1 |

The tomato juice based ferment was as effective as the sucrose based ferment for at least 80 days. It was clear from the results that *Candida tropicalis* was not able to grow on tomato sauce as the colony forming units went down in the control experiment in the first 7 days.

EXAMPLE 3

Taste of Melon Ferments Compared to Other Propionate Ferments

This experiment provides a description of the taste of these ferments in application and a comparison on taste with other propionate ferments. The comparison is based on the ISO 8587:2006 sensory analysis ranking test. The taste of the ferments is evaluated in a model drink. The recipe of this model drink is presented in Table 5.

TABLE 5 recipe of model drink

| Ingredient | Supplier | Amount [g] |
|---|---|---|
| Water | | 949.85 |
| Sucrose | Granulated sugar-Van Gilse | 40.0 |
| Apple juice concentrate | Cargill | 8.30 |
| Apple flavour | Givaudan 55078-DO | 0.35 |
| Citric acid | Across, M&A-021 | 1.50 |

In this model drink the following ferments are compared to each other:

PSP9 Liquid (see case 10 of Example 1): Concentrated liquid propionic acid ferment based on sucrose and yeast extract with a propionic acid content of 20.4% (w/w).

PSP9 Powder (see case 11 of Example 1): Powder of the ferment described above with a propionic acid content of 41% (w/w).

Melon ferment with yeast extract: Propionic ferment based on watermelon juice+10 g/L yeast extract, concentrated.

Melon ferment without yeast extract: Propionic ferment based on watermelon juice, concentrated.

PQ (see case 12 of Example 1): Propionic acid ferment based on sucrose and yeast extract, mixed with lactic acid to a total of 25%.

The ferments were compared at a propionate level of 0.05%. Table 6 shows the propionate level of each ferment and the amount that should be added to the model drink to reach a level of 0.05%.

TABLE 6 propionate levels and dosage levels of the ferments

| Ferment | Propionate level [%] | Dosage level [%] |
|---|---|---|
| PSP9 Liquid | 20.4 | 0.245 |
| PSP9 Powder | 41.0 | 0.122 |
| Melon ferment with yeast extract | 7.9 | 0.633 |
| Melon ferment without yeast extract | 6.8 | 0.735 |
| PQ | 13.7 | 0.365 |

All samples were tasted by 8 trained panelists. The panelists were asked to rank the samples from least to most different from the reference sample. The reference sample is pure model drink.

Table 7 shows the pH of the samples and the description of the taste.

TABLE 7 pH and description of the taste of samples with different propionate ferment

| Sample | pH | Description |
|---|---|---|
| X (reference = model drink) | 3.18 | Fresh, apple |
| PSP9 Liquid | 4.21 | Less fresh and apple flavour, strong ferment taste |
| PSP9 Powder | 4.23 | Less fresh and apple flavour, little ferment taste |
| Melon ferment with yeast extract | 4.30 | Less fresh and apple flavour, sweet |
| Melon ferment without yeast extract | 4.24 | Less fresh and apple flavour, sweet, little bitter |
| PQ | 3.92 | Less fresh and apple flavour, sour |

Ranking

The samples were ranked from least to most different from the reference. Table 8 shows the results of the ranking.

TABLE 8 ranking of 5 propionate ferments by 8 panellists

| Panellist | PSP9 L | PSP9 P | Melon + Y | Melon − Y | PQ |
|---|---|---|---|---|---|
| 1 | 5 | 3 | 1 | 2 | 4 |
| 2 | 5 | 3 | 2 | 1 | 4 |
| 3 | 5 | 4 | 1 | 2 | 3 |
| 4 | 5 | 4 | 2 | 1 | 3 |
| 5 | 5 | 2 | 1 | 3 | 4 |
| 6 | 4 | 1 | 3 | 2 | 5 |
| 7 | 5 | 3 | 1 | 2 | 4 |
| 8 | 5 | 1 | 4 | 2 | 3 |
| Sum | 39 | 21 | 15 | 15 | 30 |
| SD | 0.35 | 1.19 | 1.13 | 0.64 | 0.71 |

1 = least different from reference x, 5 = most different from x
n = 8
k = 5

For a panel size of 8 panellists and 5 products to rank the total score needs to be lower than 17 and or higher than 31 to indicate a significant difference (one-tailed test). It can be seen that both the samples with melon ferment with and without yeast extract have significant less influence on taste compared to the other samples. The sample with PSP9 Liquid has significant more influence on taste than the other samples. The conclusion is that melon ferments have less influence on the taste of apple juice model drink than other propionate ferments. The melon ferments have also a different taste profile; they are sweeter than the other ferments.

EXAMPLE 4

Fermentation of Honey Melon and Apple Juice with *Propionibacterium*

Preparation of the Preculture

One vial (1 ml) with a −80° C. glycerol stock of *Propionibacterium freudenreichii* ss. *shermanii* was inoculated in flask of 100 ml containing a medium containing 20 g/l of glucose and 15 g/l of yeast extract and incubated at 30° C. for 2 days. The 100 ml of culture was transferred to a 1 L bottle containing 900 ml of the same medium (20 g/l of glucose and 15 g/l of yeast extract). This bottle was incubated for 1 day at 30° C.

Fermentation of Fruit Juice

A 1 L fermenter was prepared with a diluted commercial melon juice concentrate. The concentrate was diluted to a sugar concentration of approximately 45 g/l, and 1% of yeast extract paste (50% paste from Biospringer) was added and subsequently the reactor including medium was autoclaved. The fermentation was started by adding 100 ml of the *Propionibacterium* preculture. A similar reactor was filled with a diluted commercial apple juice concentrate. The final sugar concentration was also 45 g/l. Both reactors were kept at 30° C., stirred at 150 rpm and pH controlled at a pH of 6.5 using an ADI1020 controller and 5M NaOH as a base for pH correction. The two reactors were sampled regularly and the sugar concentration and propionic acid concentration were measured. The results of these fermentations are presented in tables 8 and 9. Although the formation of propionic acid was relatively slow, the glucose was rapidly converted (<48 h) to propionic acid. This suggests that fruits with high glucose content are optimal in these kinds of fermentations.

TABLE 9 concentrations of acids and sugars in the Honeydew Melon juice fermentation (g/l)

| Hour | Propionic acid | Acetic acid | Succinic acid | Glucose | Fructose | Sucrose |
|---|---|---|---|---|---|---|
| 0 | 0 | 0.2 | 0 | 13.5 | 18.1 | 15.4 |
| 24 | 2.4 | 1.4 | 0.4 | 10.8 | 16.4 | 14.5 |
| 48 | 6.2 | 3.2 | 0.8 | <1 | 14.7 | 14.5 |
| 72 | 7.4 | 4.1 | 1.5 | <1 | 11.8 | 14.1 |
| 100 | 7.9 | 4.4 | 2.0 | <1 | 9.7 | 14.1 |
| 118 | 8.2 | 4.6 | 2.4 | <1 | 8.0 | 13.1 |

TABLE 10 concentrations of acids and sugars in the Apple juice fermentation (g/l)

| Hour | Propionic acid | Acetic acid | Succinic acid | Glucose | Fructose | Sucrose |
|---|---|---|---|---|---|---|
| 0 | 0 | 0.1 | 0 | 15.3 | 27.5 | 2.5 |
| 24 | 1.3 | 1.0 | 0.6 | 12.4 | 27.5 | 2.4 |
| 48 | 5.4 | 3.1 | 1.5 | <1 | 24.5 | 2.4 |
| 72 | 6.3 | 3.7 | 2.4 | <1 | 21.0 | 2.4 |
| 100 | 7.1 | 4.2 | 2.8 | <1 | 18.1 | 2.4 |
| 118 | 7.9 | 4.6 | 3.3 | <1 | 15.7 | 2.5 |

The invention claimed is:

1. A fruit ferment obtained by fermentation of a liquid fruit preparation with a propionic acid-producing bacterial strain, said fermentation comprising the steps of:
   i) obtaining a liquid fruit preparation having a sugar level of from 1.5 to 10% (w/w) and an initial pH of from 4.5 to 7;
   ii) fermenting the liquid fruit preparation with a propionic acid-producing bacterial strain whilst maintaining the pH between 4.5 and 7 by the addition of a base selected from the group consisting of sodium hydroxide, magnesium hydroxide, calcium hydroxide, ammonium hydroxide, calcium carbonate and ammonium carbonate; and
   iii) optionally further processing the fermentation product, to obtain the fruit ferment,
   wherein the propionic acid-producing bacterial strain used in said fermenting is supplemented with one or more strains of lactic acid producing bacteria,
   wherein said fruit of the fruit ferment does not include nuts and cereal grains,
   wherein said fruit ferment comprises:
   propionate in a concentration ranging from 0.25 to 80% (w/w); and
   succinate in a concentration ranging from 0.002 to 1% (w/w), wherein the weight ratio of propionate to succinate is in the range from 200 to 15,
   wherein the propionate does not include potassium propionate.

2. The fruit ferment according to claim 1 further comprising acetate in a concentration ranging from 0.1 to 60% (w/w), the weight ratio of propionate to acetate ranging from 0.5 to 10.

3. The fruit ferment according to claim 1, wherein the weight ratio of propionate to succinate is in the range from 150 to 25.

4. The fruit ferment of claim 2, wherein the weight ratio of propionate to succinate is in the range from 150 to 25.

5. The fruit ferment according to claim 1 containing part or all of the propionic acid-producing bacterial cells and the lactic acid-producing bacterial cells of the fermentation.

6. The fruit ferment according to claim 1, wherein said fermenting is substantially devoid of microorganisms other than said propionic acid-producing bacterial strain and said one or more strains of lactic acid producing bacteria.

7. A composition comprising a fruit ferment and additional additive ingredients for food and/or beverages, wherein said fruit of the fruit ferment does not include nuts and cereal grains and wherein said fruit ferment comprises:
 propionate in a concentration ranging from 0.25 to 80% (w/w); and
 succinate in a concentration ranging from 0.002 to 1% (w/w), wherein the weight ratio of propionate to succinate is in the range from 200 to 15,
 wherein the propionate does not include potassium propionate,
 wherein said fruit ferment is obtained by fermentation of a liquid fruit preparation with a propionic acid-producing bacterial strain, said fermentation comprising the steps of:
 i) obtaining a liquid fruit preparation having a sugar level of from 1.5 to 10% (w/w) and an initial pH of from 4.5 to 7;
 ii) fermenting the liquid fruit preparation with a propionic acid-producing bacterial strain whilst maintaining the pH between 4.5 and 7 by the addition of a base selected from the group consisting of sodium hydroxide, magnesium hydroxide, calcium hydroxide, ammonium hydroxide, calcium carbonate and ammonium carbonate; and
 iii) optionally further processing the fermentation product, to obtain the fruit ferment,
 wherein the propionic acid-producing bacterial strain used in said fermenting is supplemented with one or more strains of lactic acid producing bacteria.

8. A food or beverage comprising a fruit ferment, wherein said fruit of the fruit ferment does not include nuts and cereal grains and wherein said fruit ferment comprises:
 propionate in a concentration ranging from 0.25 to 80% (w/w); and
 succinate in a concentration ranging from 0.002 to 1% (w/w), wherein the weight ratio of propionate to succinate is in the range from 200 to 15,
 wherein the propionate does not include potassium propionate,
 wherein said fruit ferment is obtained by fermentation of a liquid fruit preparation with a propionic acid-producing bacterial strain, said fermentation comprising the steps of:
 i) obtaining a liquid fruit preparation having a sugar level of from 1.5 to 10% (w/w) and an initial pH of from 4.5 to 7;
 ii) fermenting the liquid fruit preparation with a propionic acid-producing bacterial strain whilst maintaining the pH between 4.5 and 7 by the addition of a base selected from the group consisting of sodium hydroxide, magnesium hydroxide, calcium hydroxide, ammonium hydroxide, calcium carbonate and ammonium carbonate; and
 iii) optionally further processing the fermentation product, to obtain the fruit ferment,
 wherein the propionic acid-producing bacterial strain used in said fermenting is supplemented with one or more strains of lactic acid producing bacteria.

9. The food or beverage according to claim 8 further comprising the same fruit used in preparing the fruit ferment.

10. A probiotic consisting of a fruit ferment obtained by fermentation of a liquid fruit preparation with a propionic acid-producing bacterial strain, said fermentation comprising the steps of:
 i) obtaining a liquid fruit preparation having a sugar level of from 1.5 to 10% (w/w) and an initial pH of from 4.5 to 7;
 ii) fermenting the liquid fruit preparation with a propionic acid-producing bacterial strain whilst maintaining the pH between 4.5 and 7 by the addition of a base selected from the group consisting of sodium hydroxide, magnesium hydroxide, calcium hydroxide, ammonium hydroxide, calcium carbonate and ammonium carbonate; and
 iii) optionally further processing the fermentation product, to obtain the fruit ferment,
 wherein the propionic acid-producing bacterial strain used in said fermenting is supplemented with one or more strains of lactic acid producing bacteria,
 wherein said fruit of the fruit ferment does not include nuts and cereal grains;
 wherein said fruit ferment comprises:
 propionate in a concentration ranging from 0.25 to 80% (w/w); and
 succinate in a concentration ranging from 0.002 to 1% (w/w), wherein the weight ratio of propionate to succinate is in the range from 200 to 15,
 wherein the propionate does not include potassium propionate, and
 wherein said fruit ferment contains part or all of the propionic acid-producing bacterial cells and the lactic acid-producing bacterial cells of the fermentation.

11. A fruit ferment comprising:
 propionate in a concentration ranging from 0.25 to 80% (w/w); and
 succinate in a concentration ranging from 0.002 to 1% (w/w), wherein the weight ratio of propionate to succinate is in the range from 200 to 15,
 wherein the propionate does not include potassium propionate, and
 wherein said fruit of the fruit ferment does not include nuts and cereal grains.

12. The fruit ferment according to claim 11 further comprising acetate in a concentration ranging from 0.1 to 60% (w/w), the weight ratio of propionate to acetate ranging from 0.5 to 10.

13. The fruit ferment according to f claim 11, wherein the weight ratio of propionate to succinate is in the range from 150 to 25.

14. The fruit ferment according to claim 12, wherein the weight ratio of propionate to succinate is in the range from 150 to 25.

* * * * *